Patented Jan. 9, 1951

2,537,428

UNITED STATES PATENT OFFICE 2,537,428

PYRIDINIUM SULFO COMPOUNDS

Marius Séon, Montreuil-sous-Bois, and Isidore Raitzyn, Paris, France, assignors to Compagnie de Produits Chimiques et Electrométallurgiques, Alais, Froges et Camargue, Paris, France, a society of France No Drawing. Application October 6, 1947, Serial No. 778,264. In France January 13, 1947

10 Claims. (Cl. 260—297)

The present invention is concerned with new organic compounds and with a method for preparing the same.

As well known, the quaternary salts of ammonium obtained by combining alkyl halides with tertiary heterocyclic amines are endowed with emulsifying properties and are adapted to serve as dispersive agents.

We have found that excellent emulsifiers pertaining to the class of pyridinium salts may be obtained by reacting in an anhydrous medium, a sulphochloride having the structure R'SO₂Cl with an alcohol or a phenol in the presence of a tertiary heterocyclic amine (such as pyridine and the homologs thereof taken alone or various mixtures thereof) in rated proportions.

In an anhydrous medium, a compound of a new type is formed, which is quite different from sulfonic acid or its salts as obtained by hydrolysis in the presence of heterocyclic amines in an aqueous medium according to the reaction:

$$RSO_2Cl + H_2O + ZN \rightarrow RSO_3H + ZNHCl$$

Said new compounds are represented by the following typical formula:

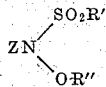

wherein ZN denotes the radical of a tertiary heterocyclic amine, and R' and R'' denote monovalent hydrocarbon radicals.

This is quite unexpected since the formation of an ester of the structure R'—SO₂—OR'' could have been expected as a result of a reaction similar to the one usually observed when reacting sulphochlorides with an alcohol in the presence of alkaline compounds (hydroxides or carbonates of alkali and earth-alkali metals).

In particular, in the above reaction aliphatic alcohols may be used such as methyl alcohol, the straight-chained and branched-chained primary homologs thereof and phenol and its homologs; however the invention is not restricted to the use of the above compounds and such compounds as the glycols, the cyclo aliphatic alcohols, cyclo-hexanol and the like may also be used.

The reaction may be effected with or without the use of pressure, at temperatures within the range of from 10 to 230° C. and both in the presence and in the absence of catalysts and/or dehydrating agents. It may be desirable to use an excess of alcohol.

In certain cases it may be desirable to operate within a neutral solvent medium serving as an anhydrous diluting medium and making for perfect homogeneousness of the reactive medium.

Upon completion of the reaction, the non-reacted fraction of the alcohol may be distilled off under vacuum or the non-reacted phenol may be removed by a suitable extraction step.

With a view to establishing the structure of the compound, another synthesis was performed and the two products obtained were found identical.

The molecular structure appears clearly from the sequence of reactions that takes place when a sulphochloride is caused to react upon a calculated amount of a tertiary heterocyclic amine, in an anhydrous medium, in such manner as to form first the sulphopyridinium chloride, the formula of which is:

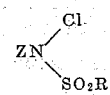

(exactly as analogous compounds are formed in an anhydrous medium with aliphatic alcohol halides and tertiary heterocyclic amines), and this chloride is caused to react with an alkaline alcoholate, introduced in calculated amount, the alkaline chloride that is formed being eliminated by filtration and the solvent being evaporated:

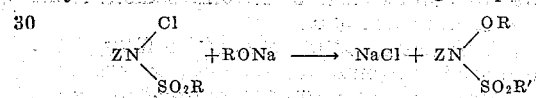

The new compounds obtained through the above-indicated reactions possess remarkable emulsifying properties. They are particularly adapted to the emulsifying of chlorinated naphthalenes as well as of products which are not soluble in water and have a greater specific gravity than water such as chlorobenzene. The emulsions thus obtained are particularly advantageous for use as agricultural insecticides and acaricides.

Such compounds are appropriate for emulsifying certain mineral oils and may be utilized particularly for the production of lubricating agencies for cutting tools.

Good results may be obtained with the following formula (in parts by weight):

| | |
|---|---|
| Emulsifier | 10 |
| Water | 20 |
| Paraffin oil | 70 |

By using a turbo-mixer, an emulsion is obtained in the form of a thin cream, light brown in shade. The secondary emulsions obtained by adding water to that mother emulsion are in the form of a permanent white milk.

Said new compounds may also be used as detergents in the cleaning of animal fibres and in particular crude wool.

The products obtained from paraffin sulphochlorides are particularly interesting although other starting material derived from natural petroleum (such as gas oil) or hydrocarbons obtained through hydrogenation of coal or Fischer synthesis and suitably sulphochlorided may be employed according to our invention.

These products are viscous oils or are solid at a temperature of 20° C., they have a low melting point, are easily soluble in water at 40° C. with a spumific (foam-producing) effect. They may contain one, two or more sulphur- and oxygen-containing groups.

Example 1

100 parts of a paraffin sulpho-chloride (melting point 52° C., average molecular weight 360) containing 8.5% sulphur and 10.5% chlorine, dissolved in 60 parts of dichlorethane are placed in reactive contact with 25 parts of anhydrous methyl alcohol. 22 parts of pyridine are added slowly and with stirring. The temperature is maintained at about 60° C. for one hour. The solvent and the non-reacted reactants are distilled off preferably under reduced pressure. An oily, yellow, water-soluble product is obtained which possesses surface-tension active properties which are common to the majority of sulphochloride derivatives but which is in this case distinguished by the particular ease with which a water solution thereof is capable of maintaining in suspension the finely subdivided particles of chlorinated naphthalenes. The stability of such emulsions is great enough to enable their shipment, storage and use.

Example 2

100 g. of sulpho-chloride of paraffin containing 9.5% of hydrolysable chlorine are dissolved in 100 cc. of dichlorethane. 21 g. of pyridine are added dropwise, the temperature being maintained at 35–40° C. during the addition.

After the reaction is completed sodium propylate is added, said sodium propylate being obtained by adding 6.2 g. of metallic sodium to an excess of propyl alcohol.

The precipated sodium chloride is filtered off. The organic solvents are removed by evaporation. The resulting product is an excellent emulsifier for chlorinated naphthalenes.

What we claim is:

1. A chemical compound corresponding to the formula:

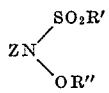

wherein ZN denotes the radical of a tertiary heterocyclic amine selected from the group consisting of pyridine and its homologs, and R' denotes a monovalent hydrocarbon radical corresponding to paraffin, and R" denotes a monovalent hydrocarbon radical.

2. A chemical compound corresponding to the formula:

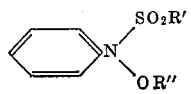

wherein R' denotes a monovalent hydrocarbon radical corresponding to paraffin, and R" denotes a monovalent hydrocarbon radical.

3. A method for preparing a new chemical compound as defined in claim 1, which comprises reacting a tertiary heterocyclic amine selected from the group consisting of pyridine and its homologs, a sulpho-chloride of paraffin and a hydroxy derivative R"OH, wherein R" denotes a monovalent hydrocarbon radical in an anhydrous medium.

4. A method for preparing a new chemical compound as defined in claim 1, which comprises reacting pyridine, a sulphochloride of paraffin, and an alcohol R"OH wherein R" denotes a monovalent hydrocarbon radical in an anhydrous medium.

5. A method for preparing a new chemical compound as defined in claim 1, which comprises reacting pyridine, a sulphochloride of paraffin, and a phenol in an anhydrous medium.

6. A method according to claim 3, which comprises reacting the tertiary heterocyclic amine with a theoretical amount of the sulphochloride and an excess of the hydroxy derivative.

7. A method for preparing a new chemical compound as defined in claim 1, which comprises in a first step, reacting a tertiary heterocyclic amine selected from the group consisting of pyridine and its homologs with a sulphochloride of paraffin in an anhydrous medium, and in a second step reacting the product of the first reaction with an alkali-metal alcoholate R"OM, wherein R" denotes a monovalent hydrocarbon radical, and M denotes an alkali metal.

8. A method for preparing a new chemical compound as defined in claim 1, which comprises in a first step, reacting pyridine with a sulphochloride of paraffin, to provide sulpho-pyridinium chloride, and in a second step reacting said sulphopyridinium chloride with an alkali-metal alcoholate R"OM, wherein R" denotes a monovalent hydrocarbon radical, and M denotes an alkali metal.

9. A method for preparing a new chemical compound as defined in claim 1, which comprises reacting pyridine with a sulphochloride of paraffin and anhydrous methyl alcohol.

10. A method for preparing a new chemical compound as defined in claim 1, which comprises in a first step, reacting pyridine with a sulphochloride of paraffin, and in a second step reacting the product obtained in the first step with sodium-propylate.

MARIUS SÉON.
ISIDORE RAITZYN.

REFERENCES CITED

The following references are of record in the file of this patent:

UNITED STATES PATENTS

| Number | Name | Date |
|---|---|---|
| 1,757,441 | Pungs | May 6, 1930 |
| 2,104,728 | Bertsch | Jan. 11, 1938 |
| 2,130,668 | Gunther | Sept. 20, 1938 |
| 2,140,519 | Elston | Dec. 20, 1938 |
| 2,172,606 | Butler | Sept. 12, 1939 |
| 2,299,782 | Allen et al. | Oct. 27, 1942 |
| 2,308,427 | Roehner et al. | Jan. 12, 1943 |
| 2,412,117 | Baker | Dec. 3, 1946 |